(12) United States Patent
Goyal et al.

(10) Patent No.: US 8,819,089 B2
(45) Date of Patent: Aug. 26, 2014

(54) MEMORY EFFICIENT REPRESENTATION OF RELATIONAL DATA WITH CONSTANT TIME RANDOM ACCESS TO THE DATA ITSELF

(75) Inventors: Arvind Goyal, Sudbury, MA (US); Gennady Agranov, Framingham, MA (US)

(73) Assignee: Antenna Vaultus Inc., Jersey City, NJ (US)

( * ) Notice: Subject to any disclaimer, the term of this patent is extended or adjusted under 35 U.S.C. 154(b) by 668 days.

(21) Appl. No.: 12/205,562

(22) Filed: Sep. 5, 2008

(65) Prior Publication Data

US 2009/0063523 A1   Mar. 5, 2009

Related U.S. Application Data

(60) Provisional application No. 60/970,164, filed on Sep. 5, 2007.

(51) Int. Cl.
*G06F 17/30* (2006.01)
(52) U.S. Cl.
USPC .......................................... 707/812
(58) Field of Classification Search
USPC .......................................... 707/812
See application file for complete search history.

(56) References Cited

U.S. PATENT DOCUMENTS

| | | | | |
|---|---|---|---|---|
| 4,606,002 A * | 8/1986 | Waisman et al. | ...................... | 1/1 |
| 5,924,112 A * | 7/1999 | Barber et al. | ................. | 711/100 |
| 6,470,423 B1 * | 10/2002 | Ho et al. | ........................ | 711/129 |
| 7,152,069 B1 * | 12/2006 | Santry et al. | .......................... | 1/1 |
| 7,707,193 B2 * | 4/2010 | Zayas et al. | .................... | 707/691 |

OTHER PUBLICATIONS

Nesbit, Kyle J., and James E. Smith. "Data cache prefetching using a global history buffer." Micro, IEEE 25.1 (2005): 90-97.*
Florescu, Daniela, and Donald Kossmann. "Storing and Querying XML Data using an RDMBS." IEEE Data Eng. Bull. 22.3 (1999): 27-34.*

* cited by examiner

*Primary Examiner* — Usmaan Saeed
*Assistant Examiner* — Nan Hutton
(74) *Attorney, Agent, or Firm* — Paul J. Sutton; Barry G. Magidoff

(57) ABSTRACT

An efficient method for storing relational data in a memory space uses B tree and B+ tree structures to store data for a database where non-identical values are stored in a string buffer and pointers to the string buffer are stored in a table buffer, and where identical data is stored only once, and each instance of that value in the database is referenced by a pointer to such identical data corresponding to the locations in the database where that identical value exists, thereby preserving physical memory and increasing the storage capacity of a fixed memory space.

9 Claims, 5 Drawing Sheets

```
                      String Buffer (Bytes)

0         1         2         3         4
Pos  01234567890123456789012345678901234567890123456789
Val  ABC/Address 1/City 1/State 1/Zip Code 1/WXYZ/Addre 5         6         7         8         9
Pos  01234567890123456789012345678901234567890123456789
Val  ss 2/Zip Code 2/TEST 1/Address 3/City 2/Zip Code 3

1         1         1         1         1
         0         1         2         3         4
Pos  01234567890123456789012345678901234567890123456789
Val  / . . .
```

```
Input:
I1: ABC, Address 1, City 1, State 1, Zip Code 1
I2: WXYZ, Address 2, City 1, State 1, Zip Code 2
I3: TEST 1, Address 3, City 2, State 1, Zip Code 3
```

Fig. 1

```
                      String Buffer (Bytes)

0         1         2         3         4
Pos   01234567890123456789012345678901234567890123456789
Val   ABC/Address 1/City 1/State 1/Zip Code 1/WXYZ/Addre 5         6         7         8         9
Pos   01234567890123456789012345678901234567890123456789
Val   ss 2/Zip Code 2/TEST 1/Address 3/City 2/Zip Code 3

1         1         1         1         1
      0         1         2         3         4
Pos   01234567890123456789012345678901234567890123456789
Val   / . . .
```

Fig. 2

```
Records:   (5 columns of 4 byte numbers)
R1: 0,       4,           14,       21,        29
    ABC,     Address 1,   City 1,   State 1,   Zip Code 1
R2: 40,      45,          14,       21,        55
    WXYZ,    Address 2,   City 1,   State 1,   Zip Code 2
R3: 66,      73,          83,       21         90
    TEST 1,  Address 3,   City 2,   State 1,   Zip Code 3
```

Fig. 3

```
Table Buffer:   (4-byte numbers)
POS  00, 04, 08, 12, 16, 20, 24, 28, 32, 36, 40, 44, 48, 52, 56
Val  00, 04, 14, 21, 29, 40, 45, 14, 21, 55, 66, 73, 83, 21, 90
     |R1,                |R2                    |R3
```

Fig. 4

```
Index Buffer:
Val  00, 40, 20, . . .
```

Fig. 5

| String Buffer | | | | |
|---|---|---|---|---|
| Buffer 1 | 1 | 5 | 15 | 21 |
| | ABC | Address 1 | City 1 | |

| | | | | |
|---|---|---|---|---|
| Buffer 2 | 1 | 9 | 20 | 25 |
| | State 1 | Zip Code 1 | WXYZ | |

| | | | | |
|---|---|---|---|---|
| Buffer 3 | 1 | 11 | 22 | 29 |
| | Address 2 | Zip Code 2 | TEST 1 | |

| | | | | |
|---|---|---|---|---|
| Buffer 4 | 1 | 11 | 18 | 29 |
| | Address 3 | City 2 | Zip Code 3 | |

FIG. 6

| DB1/TB1 | Name | Address | City | State | Zip Code |
|---|---|---|---|---|---|
| | 1 | 2 | 3 | 4 | 5 |
| | ABC | Address 1 | City 1 | State 1 | Zip Code 1 |

| 1 | 2 | 3 | 4 | 5 |
|---|---|---|---|---|
| WXYZ | Address 2 | City 1 | State 1 | Zip Code 2 |

| 1 | 2 | 3 | 4 | 5 |
|---|---|---|---|---|
| TEST 1 | Address 3 | City 2 | State 1 | Zip Code 3 |

Fig. 8

| Index Buffer ( Index is in Column 1 of DB1/TB1 | | | | |
|---|---|---|---|---|
| Buffer 1 | 10 | 24 | 120 | |
| Buffer 2 | | | | |

Fig. 9

MEMORY EFFICIENT REPRESENTATION OF RELATIONAL DATA WITH CONSTANT TIME RANDOM ACCESS TO THE DATA ITSELF

CROSS-REFERENCE TO RELATED APPLICATIONS

The present application claims priority benefit under 35 U.S.C. §119(e) of U.S. Provisional Patent Application Ser. No. 60/970,164 filed Sep. 5, 2007. The disclosure this application is incorporated herein by reference.

BACKGROUND OF THE INVENTION

Traditionally, mobile computing devices have been at a disadvantage in contrast to their non-mobile counterparts in that they have smaller viewing screens, smaller input mechanisms, smaller memory spaces, limited battery capacity, and, frequently, less powerful processors. Although all of these limitations have been substantially reduced through technological advances in the various technologies, each technological advance has largely been mirrored by an increase in the size and capability of applications that may be run on mobile devices. As a result, although modern mobile computing devices have capabilities far in excess of those of only a few years ago, there still is, and in the foreseeable future will continue to be, a premium placed upon processing power and memory capacity of mobile computing devices. When considering the memory requirements for an application and associated data, the only options for increasing the amount of data that may be stored are by enlarging the physical memory space or through software methods that can store increased amounts of data within a limited physical memory space.

B trees and B+ trees are standard methods for storing data within a searchable data structure, and either of them, or any other suitable data structure, may be used in the invention. Efficiency in this context translates to a shorter search time and a fewer number of processing steps and resulting memory accesses. By using an efficient memory data structure, processing efficiency can be improved and the time for data retrieval can be reduced, increasing the overall performance of the mobile computing device using such an efficient data structure.

This invention is a method and system by which a relational database may be implemented so as to minimize the amount of memory storage space needed for data storage while allowing for constant time random access to the data.

SUMMARY OF THE INVENTION

The data structure of this invention uses expandable string buffers, tables, and indexes to hold searchable values for a database. Variable length fields are stored in one or more string buffers, and each item of data will return a pointer to its location. Pointers are uniformly sized records that are stored in one or more tables. One or more indexes are maintained to access the records efficiently. Indexes may be based upon alphabetical or any other desired sorting criteria for indexing of records.

When a new entry is made into the system, the value for each field is checked against the existing values in the string buffer(s). If the value is found, a pointer (the buffer offset) is returned. If the value is not in the string buffer(s), the value is added into the string buffer and a pointer to it is returned. Records in the database contain a set number of fields, each of which is an n-byte pointer into a string buffer where the corresponding value for the field is stored. As such records are all of the same size—n times the number of fields (so in a 4-byte system a record with 5 fields would be 20 bytes in size), thus eliminating the need for record headers. String buffers and table buffers are maintained by using B trees, B+ trees, or other suitable data structures. Both the values stored in the string buffer, and the string buffer as a whole may be compressed using conventional techniques.

BRIEF DESCRIPTION OF THE DRAWINGS

FIG. 1 represents data as it was entered into the database.

FIG. 2 represents the data stored within the string buffer.

FIG. 3 relates information from the string buffer to records in the table buffer.

FIG. 4 represents pointers in the table buffer referencing the data of FIG. 2.

FIG. 5 represents indexes stored in the index buffer in alphabetical order.

FIG. 6 shows a graphical depiction of a non-contiguous string buffer comprising four segments and containing representative data.

FIG. 8 is a graphical representation of records retrieved from the database.

FIG. 9 graphically represents an index buffer having an alphabetical index to the table buffer of FIG. 7.

DETAILED DESCRIPTION OF THE PREFERRED EMBODIMENT

Figure 7:
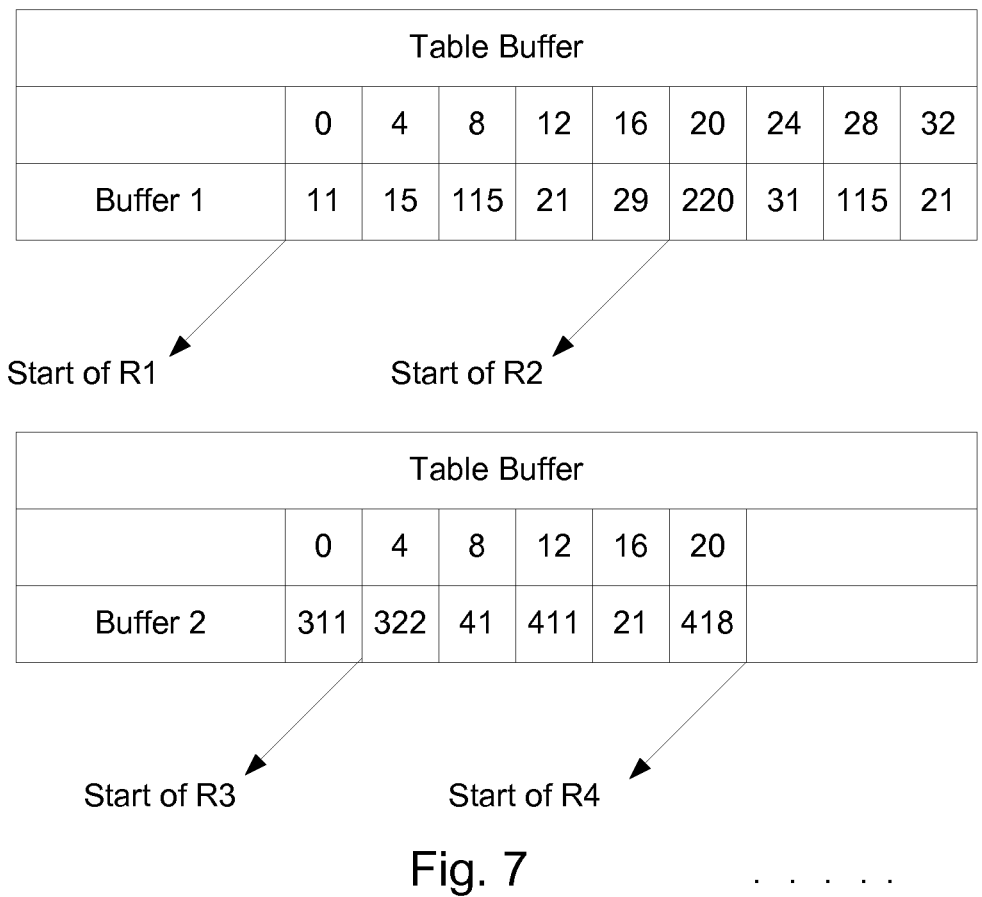
FIG. 7 graphically depicts a non-contiguous table buffer containing values related to the representative data shown in FIG. 6.

As shown in FIG. 1, information is entered into a database as a serial string of inputs I 1, I 2, and I 3. Each input string represents a named entity having an address. In practice, the information may consist of any set of related data which may include but not be limited to contact information (address, telephone numbers, e-mail addresses, etc.), accounting information, organized lists, or any other data that is or can be related to other data within an organized data structure. As data is entered, it is preferably stored contiguously in one or more string buffers, as in FIG. 2, and a pointer is returned to the table buffer. However, before each input field value is stored, the string buffer is checked to see whether the same value already exists within that buffer. If the same value does exist, a pointer to the existing value is returned and processing moves to the next input field. If that value does not exist, however, it is stored in the string buffer, preferably contiguously, and a pointer to that value is returned. Once this is done for each field in the entry, a record is added to the table, and the index is updated. The string buffers, tables and indexes are all expandable to meet demand. Although a single string buffer, table buffer, and index buffer are referenced, it will be understood that each buffer may comprise more than one continuous segment, and that such occurrence will have little or no effect upon the application or efficiency of the invention. The string buffers and pointers are maintained by using either B trees, B+ trees or other suitable data structure.

FIG. 3 references field values from the string buffer with pointers (offsets within the string buffer) indicating the memory locations in one or more string buffer(s) at which each field value may be found. Pointers have a fixed size and are maintained in one or more table buffers. Each pointer is a number comprising n-bytes. In the preferred embodiment, n=4 bytes, although pointers of any reasonable size can be used. Where n=4 bytes, and each record has five fields or columns, as in the example depicted in the drawings, each record in the string buffer, regardless of length, will be referenced using only 20 bytes of memory in the table buffer. This may be seen, for example, in the storage of Record R1 in the string buffer (FIG. 2). The "Name" value for the first record ("ABC") is stored at string buffer offset 00. A pointer in the table buffer to that value points to offset 0 in the string buffer. The "Address", "City", "State", and "Zip Code" fields for Record R1 are similarly pointed to at offsets 4, 14, 21 and 29, respectively.

Record R2 may similarly be located by reference to FIGS. 2 and 3. However, as is shown in FIG. 3, the "City" and "State" fields for Record R2 are the same as for Record R1, and will not be duplicated in the string buffer (FIG. 2). Rather, as shown in FIG. 3, pointers to "City 1" and "State 1" for Record R2 will point to the offsets in the string buffer where those values are already stored, at offsets 14 and 21. Similarly, Record R3 has a value for "State" that is the same as for Records R1 and R2. Hence, the pointer in Record R3 points to offset 21 in the string buffer, and avoids the need for duplicate values to be entered into the string buffer.

As shown in FIG. 4, each pointer ("Val") in the table buffer is a 4-byte value, the positions within that buffer being of a uniform size. Each record utilizes five 4-byte values, or a total of 20 bytes. The indicators "R1," "R2," and "R3" are not part of the table itself, but are given only for reference in showing the structure of the table.

FIG. 5 shows an index buffer in which the beginning offset for each record in the table buffer is given. The index buffer shows the records in alphabetical order, with "ABC" being the "Name" for the first record, and being located by referring to offset 00 in the table buffer which, in turn, references offset 00 in the string buffer. The second record begins with a "T" (for entity "TEST 1"). In the index buffer, the second alphabetical record is shown with a value of 40. Referring to offset 40 in the table buffer, the offset at location 66 in the string buffer is where the record begins, as can be verified by reference to FIG. 2. The third record alphabetically begins with the name "WXYZ," and may be located in the index buffer at value 20, referring to offset 20 in the table buffer, which points to location 40 in the string buffer.

FIGS. 1-5 depict the data structure of the invention in idealized format. That is, each entry is located contiguous to the preceding and subsequent entries, with no gaps in the relevant memory buffers. In practice, however, such is seldom the case, as memory storage may require the use of non-contiguous blocks of memory. This is particularly so where long term storage may be maintained on a disc drive. Because of this potential limitation, FIGS. 6, 7, and 9 represent the efficient memory utilization of the invention under conditions that may be encountered in practice.

FIG. 6 depicts a string buffer comprising four non-contiguous buffers, each beginning at offset "1" and being capable of holding fewer than 30 characters. A comparison of FIGS. 1 and 6 shows that identical data has been entered and stored in memory, with FIG. 6 showing the data distributed across four non-contiguous string buffers. FIG. 7 depicts a table buffer comprising two non-contiguous buffers, each beginning at offset 0. In this depiction, however, pointers to the string buffer are made by first referencing the buffer number (1-4), followed by the offset within that buffer. For example in table buffer No. 1, the first field ("Name") in record (R1) is referenced as string buffer no. 1, offset 1. The second field ("Address") is referenced at string buffer no. 1, offset 5. This procedure is followed for all pointers in the table buffer. Once entered, such information can be stored and later recalled for display or printing as shown in FIG. 8. In FIG. 8, the information is formatted as discrete records divided into separate fields as mailing addresses in the United States, each record having five fields, each field representing an entity name, a street or box office address, a city, a state, and a zip code.

FIG. 9 depicts an index buffer in which records stored in the string buffer of FIG. 6 and the table buffer of FIG. 7 may be retrieved or listed in alphabetical order, using the same buffer number—offset location schema as described for FIGS. 6 and 7.

It will be understood that the embodiments shown herein are exemplary and instructional, and that the invention is not limited to such embodiments and examples, but may be used for the efficient storage of any items of related data or information without departing from the scope and spirit of the invention.

The invention claimed is:

1. A method for organizing and storing related items of data in a memory space comprising the steps of:
    (a) dividing a memory space into at least a string buffer and a table buffer, said table buffer containing at least one record where each of said at least one record comprises an equal number of equal size fields each of which being configured to contain pointers that reference related items of data stored in the string buffer;
    (b) determining a resulting database structure capable of holding at least one field and at least two records where each of said at least two records contains a pointer that refer to data stored in the database structure;
    (c) accepting input of discrete items of related data, said discrete items comprising field values within one or more records;
    (d) storing a first field value in said string buffer at a first location within said string buffer;
    (e) returning a first string pointer to an offset in said string buffer where said first field value is stored;
    (f) storing said first string pointer in a first location within said table buffer where said first location and each of all other locations in said table buffer have a fixed size equal to the size of the fixed size pointer;
    (g) repeating steps (a)-(f) for all field values comprising a first record;
    (h) if additional data has been accepted, determining a next field value for a next record;
    (i) searching said string buffer to determine whether said next field value exists within said string buffer;
    (j) if said next field value exists within said string buffer, returning a next string pointer to said stored field value in said string buffer and storing said next string pointer in a fixed size next location within said table buffer;
    (k) if said next field value does not exist within said string buffer, storing said next field value in said string buffer at a next location within said string buffer, returning a next string pointer to said next location in said string buffer, and storing said next string pointer in a next location within said table buffer;
    (l) repeating steps (h)-(k) for all field values for said next record; and
    (m) repeating step (l) for all records until all records have been stored.

2. The method of claim 1, further comprising the steps of dividing said memory space to include at least one index buffer; storing in said buffer a plurality of table pointers; each said table pointers referencing the location in said table buffer of a first field in a record in said string buffer; said plurality of table pointers being sorted and stored consecutively in said index buffer in accordance with predetermined sorting criteria related to said records stored in said string buffer.

3. The method of claim 1 wherein each said buffer comprises one or more contiguous memory locations within said memory space.

4. The method of claim 3 wherein addresses referencing non-contiguous memory locations within said memory space are translated by an operating system to appear as contiguous memory locations.

5. The method of claim 2 further comprising compressing the data in said string buffer and compressing the data in said table buffer.

6. The method of claim 2 further comprising storing data in said string buffer within a searchable B tree data structure.

7. The method of claim 2 further comprising storing data in said string buffer within a searchable B+ tree data structure.

8. The method of claim 2 further comprising storing data in said table buffer within a searchable B tree data structure.

9. The method of claim 2 further comprising storing data in said table buffer within a searchable B+ tree data structure.

\* \* \* \* \*